United States Patent
Bae

(10) Patent No.: US 9,505,911 B2
(45) Date of Patent: Nov. 29, 2016

(54) CARBON NANOTUBE ULTRA-HIGH MOLECULAR WEIGHT POLYETHYLENE COMPOSITE, MOLDED ARTICLE INCLUDING THE SAME, AND METHOD OF FABRICATING THE MOLDED ARTICLE

(71) Applicant: Samsung Display Co., Ltd., Yongin (KR)

(72) Inventor: Jinwoo Bae, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 318 days.

(21) Appl. No.: 14/056,606

(22) Filed: Oct. 17, 2013

(65) Prior Publication Data

US 2014/0329949 A1  Nov. 6, 2014

(30) Foreign Application Priority Data

May 2, 2013  (KR) .................. 10-2013-0049501

(51) Int. Cl.
| | |
|---|---|
| C08K 7/06 | (2006.01) |
| C08K 5/17 | (2006.01) |
| C08L 23/06 | (2006.01) |
| C08L 23/04 | (2006.01) |
| C08K 3/04 | (2006.01) |
| C08J 3/20 | (2006.01) |
| C08K 7/24 | (2006.01) |

(52) U.S. Cl.
CPC ............. *C08K 7/06* (2013.01); *C08J 3/203* (2013.01); *C08K 5/17* (2013.01); *C08K 7/24* (2013.01); *C08J 2323/06* (2013.01); *C08K 2201/011* (2013.01)

(58) Field of Classification Search
CPC .......... C08K 7/06; C08K 5/17; C08K 3/04; C08J 2323/06; C08L 23/06; C08L 23/04; C08L 2207/068

USPC .......................................................... 524/495
See application file for complete search history.

(56) References Cited

U.S. PATENT DOCUMENTS

| | | | |
|---|---|---|---|
| 4,281,070 A | 7/1981 | Scheetz et al. | |
| 7,717,139 B2 | 5/2010 | Brule | |
| 7,935,275 B2 | 5/2011 | Miyoshi et al. | |
| 2007/0181855 A1 | 8/2007 | Nagao et al. | |
| 2007/0276094 A1* | 11/2007 | Kakarala ............ | B29B 9/12 525/231 |
| 2010/0331995 A1* | 12/2010 | Smelt ................. | A61L 27/16 623/23.39 |
| 2011/0251331 A1 | 10/2011 | McAndrew et al. | |
| 2012/0121840 A1 | 5/2012 | Aksay et al. | |
| 2012/0217682 A1 | 8/2012 | Vignola et al. | |
| 2012/0237749 A1 | 9/2012 | Aksay et al. | |
| 2012/0244333 A1 | 9/2012 | Aksay et al. | |
| 2012/0292578 A1* | 11/2012 | Bacher .............. | B82Y 30/00 252/511 |

FOREIGN PATENT DOCUMENTS

| | | |
|---|---|---|
| JP | 2009-126985 | 6/2009 |
| JP | 2012-224687 | 11/2012 |
| KR | 10-0454587 | 11/2004 |
| KR | 10-0590138 | 6/2006 |
| KR | 10-2009-0033276 | 4/2009 |

OTHER PUBLICATIONS

KR10-2003-0005710—machine translation—Nov. 3, 2004—Lim et al.*

* cited by examiner

*Primary Examiner* — Bijan Ahvazi
*Assistant Examiner* — Ronald Grinsted
(74) *Attorney, Agent, or Firm* — H.C. Park & Associates, PLC

(57) ABSTRACT

A carbon nanotube-ultra-high molecular weight polyethylene composite includes about 99 parts by weight to about 99.8 parts by weight of ultra-high molecular weight polyethylene, about 0.2 parts by weight to about 1 part by weight of carbon nanotubes, and about 0.1 parts by weight to about 0.5 parts by weight of a light stabilizer.

9 Claims, 1 Drawing Sheet

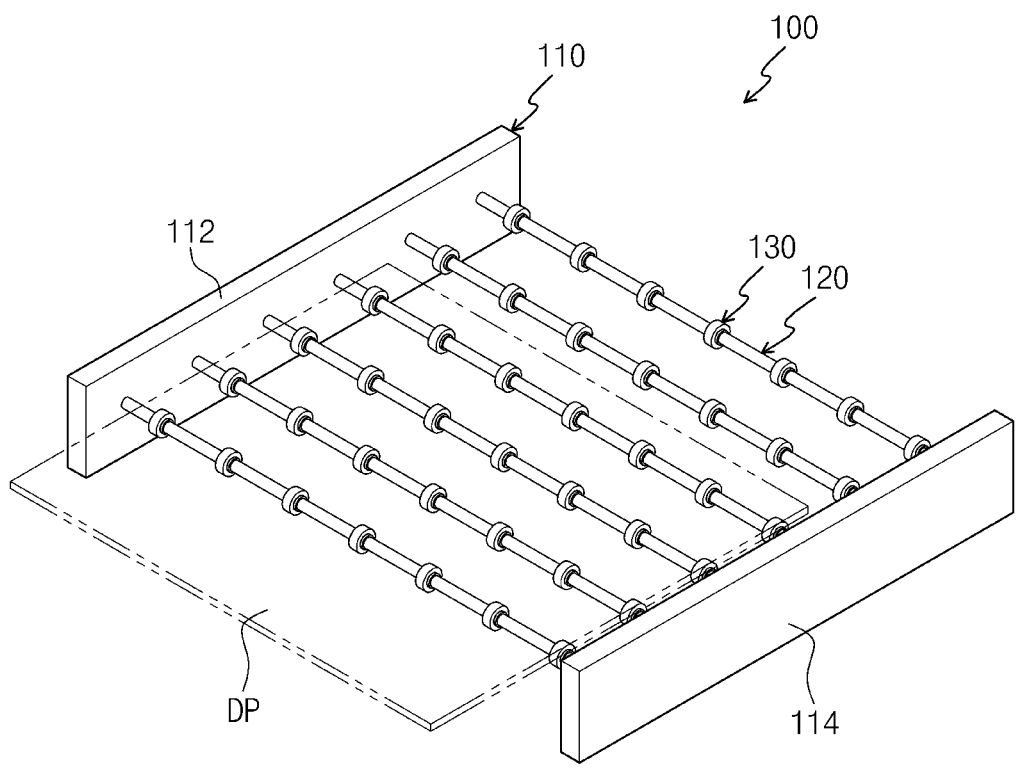

CARBON NANOTUBE ULTRA-HIGH MOLECULAR WEIGHT POLYETHYLENE COMPOSITE, MOLDED ARTICLE INCLUDING THE SAME, AND METHOD OF FABRICATING THE MOLDED ARTICLE

CROSS-REFERENCE TO RELATED APPLICATION

This application claims priority from and the benefit of Korean Patent Application No. 10-2013-0049501, filed on May 2, 2013, which is incorporated by reference for all purposes as if set forth herein.

BACKGROUND

Field

Exemplary embodiments relate to a carbon nanotube ultra-high molecular weight polyethylene composite, a molded article including the same, and a method of fabricating the molded article.

Discussion

Conventional ultra-high molecular weight polyethylene resins typically have good wear resistance and impact resistance in comparison to other resins. These ultra-high molecular weight polyethylene resins are typically used in association with machine parts, such as gears, bearings, cams, mechanical seals, etc., that benefit from wear resistance and impact resistance.

It is also recognized that some machine parts may be utilized to simultaneously provide a determined electrical conductivity and light stability, as well as provide wear resistance and impact resistance.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a carbon nanotube ultra-high molecular weight polyethylene composite with improved electrical properties and light stability.

Exemplary embodiments provide a molded article including the carbon nanotube ultra-high molecular weight polyethylene composite.

Exemplary embodiments provide a method of fabricating a molded article including the carbon nanotube ultra-high molecular weight polyethylene composite.

Additional aspects will be set forth in the detailed description which follows and, in part, will be apparent from the disclosure, or may be learned by practice of the invention.

According to exemplary embodiments, a carbon nanotube ultra-high molecular weight polyethylene composite includes: about 99 parts by weight to about 99.8 parts by weight of ultra-high molecular weight polyethylene; about 0.2 parts by weight to about 1 part by weight of carbon nanotubes; and about 0.1 parts by weight to about 0.5 parts by weight of a light stabilizer.

According to exemplary embodiments, a molded article includes a carbon nanotube-ultra-high molecular weight polyethylene composite, the composite includes: about 99 parts by weight to about 99.8 parts by weight of ultra-high molecular weight polyethylene; about 0.2 parts by weight to about 1 part by weight of carbon nanotubes; and about 0.1 parts by weight to about 0.5 parts by weight of a light stabilizer.

According to exemplary embodiments, a method of fabricating a molded article with a carbon nanotube ultra-high molecular weight polyethylene composite, includes: preparing a composite by mixing carbon nanotubes, ultra-high molecular weight polyethylene, and a light stabilizer; forming pellets by providing the composite to a twin screw extruder; preparing a powder by freeze-pulverizing the pellets, and fabricating a molded article by providing the powder to a ram extruder.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description, serve to explain principles of the invention.

FIG. 1 is a perspective view of a display panel transferring apparatus, according to exemplary embodiments.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Carbon Nanotube Ultra-High Molecular Weight Polyethylene Composite

According to exemplary embodiments, a carbon nanotube ultra-high molecular weight polyethylene composite (hereinafter, referred to as "composite") may include ultra-high molecular weight polyethylene, carbon nanotubes, and a light stabilizer. The composite may include about 99 parts by weight to about 99.8 parts by weight of the ultra-high molecular weight polyethylene, about 0.2 parts by weight to about 1 part by weight of the carbon nanotubes, and about 0.1 parts by weight to about 0.5 parts by weight of the light stabilizer. For instance, the composite may include about 99.2 parts by weight to about 99.6 parts by weight, e.g., 99.3 parts by weight to about 99.5 parts by weight, of the ultra-high molecular weight polyethylene. The composite may include about 0.2 parts by weight to about 0.5 parts by weight, e.g., about 0.3 parts by weight to about 0.4 parts by weight, of the carbon nanotubes. Further, the composition may include about 0.2 parts by weight to about 0.4 parts by weight, e.g., about 0.25 parts by weight to about 0.35 parts by weight, of the light stabilizer.

The ultra-high molecular weight polyethylene may have a molecular weight ranging from about 1,000,000 g/mol to about 10,000,000 g/mol, e.g., about 3,000,000 g/mol to about 7,000,000 g/mol, such as about 4,000,000 g/mol to about 6,000,000 g/mol. For instance, the ultra-high molecular weight polyethylene may have a molecular weight of about $2.0 \times 10^6$ g/mol. The molecular weight of the ultra-high molecular weight polyethylene may be about 10 times or more than the molecular weight of the polyethylene. The composite may exhibit better wear resistance and impact resistance characteristics than those of a typical, conventional resins due, at least in part, to the ultra-high molecular weight polyethylene.

The carbon nanotubes may be utilized to control (or otherwise regulate) electrical conductivity of the composite. A generalized diameter (or greatest distance between any two points on the boundary of a closed figure) of a cross-sectional shape of the carbon nanotube may be in a range of about 8 nm to about 15 nm, e.g., about 10 nm to about 13 nm, such as about 11 nm to about 12 nm. In this manner, the cross-sectional shape may be any suitable geometric shape, e.g., circular, triangular, hexagonal, etc. An average length (or longitudinal dimension) of the carbon nanotubes may be in a range of about 10 μm to about 100 μm, e.g., about 30 μm to about 80 μm, such as about 50 μm to about 60 μm. The carbon nanotube ultra-high molecular weight polyethylene composite may include multi-walled carbon nanotubes (MWCNTs).

To prepare a composite with electrical conductivity suitable for antistatic applications, an amount of the carbon nanotubes may be in a range of about 0.2 parts by weight to about 0.5 parts by weight, e.g., about 0.3 parts by weight to about 0.4 parts by weight, such as about 0.35 parts by weight to about 0.45 parts by weight. In this manner, an electrical resistance per unit length (where the unit length is a centimeter) of the composite may be in a range of about $10^5 \Omega$ to about $10^9 \Omega$, e.g., about $10^6 \Omega$ to about $10^8 \Omega$, such as about $10^7 \Omega$.

According to exemplary embodiments, a hindered amine light stabilizer (HALS) may be used as the light stabilizer; however, any other suitable light stabilizer may be utilized. To this end, an ultraviolet absorbent may also be used. The hindered amine light stabilizer may be selected from the group consisting of polycondensates of dibutylamine-1,3,5-triazine-N,N'-bis(2,2,6,6-tetramethyl-4-piperidyl)-1,6-hexamethylenediamine and N-(2,2,6,6-tetramethyl-4-piperidyl) butylamine. For example, the hindered amine light stabilizer may be one or more of a Tinuvin™ series, Chimassorb™ series, and/or Uvinul™ series hindered amine light stabilizer of BASF Corporation, a Cyasorb™ series hindered amine light stabilizer of Cytec Industries Inc., and/or an Adk Stab™ series hindered amine light stabilizer of ADEKA Corporation.

Molded Article including Carbon Nanotube Ultra-High Molecular Weight Polyethylene Composite FIG. 1 is a perspective view of a display panel transferring apparatus, according to exemplary embodiments.

A molded article fabricated from the carbon nanotube-ultra-high molecular weight polyethylene composite according to exemplary embodiments may be a roller of an apparatus configured to transfer display panels or any other suitably transferrable article. It is noted, however, that the molded article fabricated from the carbon nanotube-ultra-high molecular weight polyethylene composite according to exemplary embodiments may be any suitable machine part, such as, for instance, a gear, bearing, cam, mechanical seal, etc. To this end, the molded article fabricated from the carbon nanotube-ultra-high molecular weight polyethylene composite according to exemplary embodiments may be utilized in association with any suitable article, such as articles of commerce.

As illustrated in FIG. 1, a display panel transferring apparatus 100 includes a body unit 110, a plurality of shafts 120, and a plurality of rollers 130. It is noted that the rollers 130 may be coupled to or integrally formed as part of a shaft 120.

The body unit 110 includes a first frame 112 and a second frame 114 spaced apart from the first frame 112 by a determined distance. Respective first ends of the plurality of shafts 120 are supported by the first frame 112 and respective second ends of the plurality of shafts 120 are supported by the second frame 114. In exemplary embodiments, each of the plurality of shafts 120 includes a respective plurality of rollers 130 that are coupled to the respective shaft 120. To this end, each of the plurality of rollers 130 may include a coupling hole through which a corresponding shaft 120 among the plurality of shafts 120 may be inserted. The size and shape of the plurality of rollers 130 may be changed, such as, based on, the implementation of the apparatus 100.

Although not illustrated, a power unit and a controller may be utilized in association with apparatus 100 to provide power to the shafts 120, e.g., to rotate one or more of the plurality of shafts 120 with respect to, for example, respective longitudinal axes of rotation. To this end, the plurality of rollers 130 may be configured to rotate as the respective plurality of shafts 120 rotate. As such, an article, e.g., display panel DP, may be transferred from one location to another based on the rotation of the plurality of shafts 120 and the plurality of rollers 130.

According to exemplary embodiments, the display panel DP may be utilized to generate an image, such as an organic light-emitting display panel, a liquid crystal display panel, a plasma display panel, etc. It is contemplated, however, that the display panel DP may be a functional panel, such as, for instance, a touch panel, which may be used in a display device. To this end, the display panel DP may be an incomplete panel in an intermediate manufacturing stage and/or a complete panel. It is noted, however, that the display panel DP may relate to any other suitably transferrable article.

In exemplary embodiments, the display panel DP includes a substrate in which a plurality of interconnections and a plurality of transistors are formed. In addition, various active devices may be disposed on the substrate. Accordingly, when the display panel DP is transferred by the apparatus 100 from one location to another, the display panel DP may be "rubbed" by one or more of the plurality of rollers 130. As such, the carbon nanotubes included in the plurality of rollers 130 may be utilized to distribute electric charges to the display panel DP in order to prevent (or otherwise reduce) the generation of static electricity. In this manner, the active devices of the display panel DP may be prevented from being damaged by static electricity and/or electrostatic discharge.

According to exemplary embodiments, even when the plurality of rollers 130 have electrical conductivity suitable for antistatic applications, the plurality of rollers 130 include a relatively smaller amount of the carbon nanotubes than the amount of the ultra-high molecular weight polyethylene. As such, wear resistance of the plurality of rollers 130 may be maintained similar to that of conventional rollers that do not include the carbon nanotubes, even though the plurality of rollers 130 are also configured with electrical conductivity.

It is noted that the display panel DP may be exposed to ultraviolet light during the transfer process. For example, the display panel DP may be exposed to ultraviolet light during photolithography. In this manner, the plurality of rollers 130 may also be exposed to the ultraviolet light. The light stabilizer included in the plurality of rollers 130 may be utilized to prevent decomposition (e.g., partial decomposition) of the plurality of rollers 130 due to the ultraviolet light. As such, the useable lifespan of the transferring apparatus 100 may be increased. To this end, contamination of the display panel DP due to dust generated when photolysis of the plurality of rollers 130 occurs may also be prevented or otherwise reduced.

Fabrication Method of Molded Article

In a method of fabricating a molded article according to exemplary embodiments, carbon nanotube-ultra-high molecular weight polyethylene composite pellets may be formed, the pellets may be powdered, and a molded article may be fabricated from the powder. In exemplary embodiments, the carbon nanotubes and the light stabilizer may be uniformly dispersed in the ultra-high molecular weight polyethylene. Formation of the carbon nanotube-ultra-high molecular weight polyethylene composite pellets, powdering of the formed pellets, and molding of an article will now be described in more detail.

A composite is prepared by mixing the carbon nanotubes, the ultra-high molecular weight polyethylene, and the light stabilizer in a determined part by weight mixture ratio of these constituent elements. In exemplary embodiments, the carbon nanotubes and the light stabilizer are uniformly mixed, and a mixture of the carbon nanotubes and the light stabilizer is then added to the ultra-high molecular weight polyethylene for mixture. For instance, the ultra-high molecular weight polyethylene may be mixed while the mixture of the carbon nanotubes and the light stabilizer is added to the ultra-high molecular weight polyethylene.

The mixture of the carbon nanotubes, the ultra-high molecular weight polyethylene, and the light stabilizer is formed into pellets using a twin screw extruder. It is noted, however, that any other process to form the pellets may be utilized. In association with the twin screw extruder, however, pellets are formed by cutting an intermediate molded article having the shape of a rod being extruded (or otherwise discharged) from the twin screw extruder. The intermediate molded article is extruded at a temperature ranging from about 190° C. to about 220° C. Two screws of the twin screw extruder secondarily mix the composite provided to the twin screw extruder. In this manner, the carbon nanotubes and the light stabilizer of the intermediate molded article may be uniformly dispersed in the ultra-high molecular weight polyethylene.

A powder is prepared by freeze-pulverizing the pellets. In other words, the pellets are frozen and the frozen pellets are pulverized into a powder. The powder may be dried in an oven to remove moisture from the powder. It is contemplated, however, that any other suitable process to generate the powder from the pellets may be utilized.

A molded article may be fabricated by providing the powder to a ram extruder. In this manner, the molded article may be extruded from the ram extruder at a temperature ranging from about 190° C. to about 220° C. The shape of the molded article may be determined according to a shape of a channel included in the ram extruder. For example, the molded article may be a rod, the rod having a cylindrical shape. To this end, the extruded mass may be cut to form an extruded mass of a determined length. In association with exemplary embodiments described herein, holes may be formed through surfaces of the extruded mass of a determined length to form a roller, such as illustrated in FIG. 1. It is also contemplated that the ram extruder may be configured to extrude, for example, an annulus, such that, when the extruded mass is cut, the cut extruded mass forms a roller 130.

EXAMPLES AND COMPARATIVE EXAMPLES

The following Table 1 provides exemplary by weight mixture ratios of the aforementioned constituent components of seven (7) different illustrative carbon nanotube ultra-high molecular weight polyethylene composites and physical properties associated therewith, such as, for example, tensile strength, impact strength, electrical resistance, wear property, and gray scale. The following Table 2 provides exemplary by weight mixture ratios of constituent components of five (5) comparative examples and physical properties associated therewith. The physical properties of Tables 1 and 2 were measured for molded articles having a plate shape.

Tensile strength was measured in accordance with International Organization for Standardization's ISO standard 527-1 and ISO standard 527-2. Tensile strength of each molded article of the illustrative examples and the comparative examples were evaluated five (5) times at a crosshead speed of about 5 mm/min. As such, the tensile strength values provided in Tables 1 and 2 are average values of the five tensile strengths.

Impact strength was measured in accordance with International Organization for Standardization's ISO standard 179. In this manner, a Charpy impact strength test was performed on each molded article of the illustrative examples and the comparative examples five (5) times. As such, the impact strength values provided in Tables 1 and 2 are average values of the five impact strengths.

Electrical resistance was measured in accordance with Korean Industrial Standard KS M ISO 291. The electrical resistance was measured using a surface resistance meter satisfying the specifications of "surface resistance measurements of static dissipative planar materials." Resistance values were measured for five (5) points on each molded article of the illustrative examples and the comparative examples. As such, the electrical resistance values provided in Tables 1 and 2 are average values of the five (5) electrical resistances.

Wear property was measured using a friction and wear tester including a reciprocating glass jig. After the reciprocating motion of the glass jig was terminated, wear depths on surfaces of the molded articles were measured by using a surface roughness tester.

In Table 1 below, UHMWPE denotes ultra-high molecular weight polyethylene, CNT denotes carbon nanotubes, and HALS denotes a hindered amine light stabilizer. In Table 2 below, C/B denotes carbon black.

TABLE 1

|  | UHMWPE | CNT | HALS | Tensile strength (MPa) | Impact strength (MPa) | Electrical resistance ($\Omega$) | Wear property ($\mu$m) | Gray Scale (G/S) |
| --- | --- | --- | --- | --- | --- | --- | --- | --- |
| Example 1 | 99.8 | 0.2 | 0.3 | 21.5 | 21.0 | $10^7$-$10^9$ | 15 | 4.5 |
| Example 2 | 99.7 | 0.3 | 0.3 | 21.8 | 21.4 | $10^5$-$10^7$ | 16 | 4.5 |
| Example 3 | 99.6 | 0.4 | 0.3 | 21.8 | 21.6 | $10^4$-$10^6$ | 16 | 4.5 |
| Example 4 | 99.5 | 0.5 | 0.3 | 22.1 | 22.4 | $10^3$-$10^5$ | 16 | 4.5 |
| Example 5 | 99.5 | 0.5 | 0.2 | 22.2 | 22.3 | $10^3$-$10^5$ | 16 | 3.5 |
| Example 6 | 99.5 | 0.5 | 0.1 | 22.4 | 22.3 | $10^3$-$10^5$ | 16 | 3.0 |
| Example 7 | 99 | 1 | 0.3 | 24.8 | 23.8 | $10^2$ or less | 17 | 4.5 |

The molded articles of Examples 1 to 7 were fabricated from ultra-high molecular weight polyethylene having a weight-average molecular weight ranging from about 9,000,000 to about 10,000,000 g/mol, carbon nanotubes having a cross-sectional diameter ranging from about 8 nm to about 15 nm, an average length ranging from about 10 μm to about 100 μm, and a surface area ranging from about 150 m²/g to about 200 m²/g, and a hindered amine light stabilizer, Tinuvin™ 770 of BASF Corporation.

The ultra-high molecular weight polyethylene, the carbon nanotubes, and the hindered amine light stabilizer were mixed and an intermediate molded article was extruded using a twin screw extruder, HYPERKTX 30MX of KOBELCO. Pellets were formed by cutting the intermediate molded article extruded at a temperature ranging from about 190° C. to about 220° C. The pellets were freeze-pulverized using liquid nitrogen, and the freeze-pulverized pellets were then dried at about 80° C. for about 2 hours. As a result, powder having an average particle diameter of about 120 µm was prepared.

Molded articles were fabricated by providing the prepared powder to a ram extruder. Rod-shaped molded articles were fabricated at a temperature ranging from about 190° C. to about 220° C. The molded articles were annealed at a temperature ranging from about 120° C. to about 140° C. for about 24 hours to about 72 hours. Plate-shaped molded articles for measuring physical properties were then fabricated using a milling machine.

Also, Examples 1 to 7 had wear properties lower than those of Comparative Examples 1 to 4, which was due, at least in part, because the carbon nanotubes in Examples 1 to 7 were uniformly dispersed during fabrication of the composite.

Different from Examples 1 to 7, a hindered amine light stabilizer was not included in Comparative Example 5. A gray scale value G/S is a measure of light resistance of each of the Examples 1 to 7. The gray scale value G/S of Comparative Example 5 was about 2.5 and Comparative Example 5 had a darker color in comparison to Examples 1 to 7. This is due, as least in part, to Example 5 being decomposed and discolored by exposure to ultraviolet light. In Tables 1 and 2, a minimum gray scale value G/S was about 0.5, and a maximum gray scale value G/S was about 5, in which the maximum gray scale value G/S was divided into 10 steps.

Examples 1 to 6 exhibited resistance values greater than that of Example 7. Electrical resistance per unit length (with the unit length being a centimeter) of Examples 1 to 6 having a content of carbon nanotubes lower than that of Example 7

TABLE 2

|  | UHMWPE | C/B | HALS | Tensile strength (MPa) | Impact strength (MPa) | Electrical resistance (Ω) | Wear property (µm) | Gray Scale (G/S) |
|---|---|---|---|---|---|---|---|---|
| Comparative Example 1 | 99.7 | 0.3 | — | 21.1 | 21.3 | $10^7$-$10^9$ | 20 | 2.5 |
| Comparative Example 2 | 99 | 1 | — | 23.5 | 23.4 | $10^5$-$10^7$ | 23 | 3.0 |
| Comparative Example 3 | 99.7 | 0.3 | 0.3 | 21.4 | 21.2 | $10^7$-$10^9$ | 21 | 3.0 |
| Comparative Example 4 | 99 | 1 | 0.3 | 23.6 | 23.5 | $10^5$-$10^7$ | 22 | 3.5 |
| Comparative Example 5 | 99.5 | 0.5 | — | 22.2 | 22.2 | $10^3$-$10^5$ | 17 | 2.5 |

The molded articles of Comparative Examples 1 to 4 were fabricated from high molecular weight polyethylene having a weight-average molecular weight ranging from about 9,000,000 g/mol to about 10,000,000 g/mol, carbon black having an average particle diameter ranging from about 1 µm to about 50 µm, and a hindered amine light stabilizer, Tinuvin™ 770 of BASF Corporation.

Molded articles were fabricated by providing the above-noted mixture to a ram extruder. Rod-shaped molded articles were fabricated at a temperature ranging from about 190° C. to about 220° C. The molded articles were annealed at a temperature ranging from about 120° C. to about 140° C. for about 24 hours to about 72 hours, and plate-shaped molded articles for measuring physical properties were fabricated using a milling machine.

A molded article of Comparative Example 5 was fabricated in the same manner as Examples 1 to 7 except that a hindered amine light stabilizer was not included.

Example 2 exhibited physical properties of the molded article in which carbon black of Comparative Example 3 was replaced with carbon nanotubes. Example 2 had tensile strength and impact strength greater than those of Comparative Example 3. Example 7 exhibited physical properties of the molded article in which carbon black of Comparative Example 4 was replaced with carbon nanotubes. Example 7 had tensile strength and impact strength greater than those of Comparative Example 4. As such, the molded articles according to the compositions and fabrication method of the exemplary embodiments were stronger than those of the molded articles according to other compositions and fabrication method.

was in a range of about $10^5 \Omega$ to about $10^9 \Omega$, which is in a range suitable for antistatic applications.

The carbon nanotube-ultra-high molecular weight polyethylene composite includes a light stabilizer in order prevent (or otherwise reduce) decomposition by ultraviolet light. Also, the carbon nanotube-ultra-high molecular weight polyethylene composite has electrical conductivity in a range suitable for antistatic applications. As such, because exemplary rollers including the composite are not photolyzed, contamination of, for instance, a display panel due, at least in part, to dust of a decomposed roller may be prevented or otherwise reduced. Furthermore, a failure of the display panel due to static electricity buildup and/or electrostatic discharge during the transfer of the display panel may be prevented or otherwise reduced.

According to exemplary embodiments, the carbon nanotubes may be uniformly dispersed in the carbon nanotube-ultra-high molecular weight polyethylene composite. In this manner, partial wear of a composite fabricated by the above method may be reduced. Also, the composite fabricated by the above method may have uniform (or substantially uniform) electrical conductivity. Furthermore, since the method of fabricating a molded article does not use a catalyst or solvent, fabrication costs may be lowered and fabrication time may be reduced.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of fabricating a molded article from a carbon nanotube-ultra-high molecular weight polyethylene composite, the method comprising:
   preparing a composite by mixing carbon nanotubes, ultra-high molecular weight polyethylene, and a light stabilizer;
   forming pellets from the composite;
   preparing a powder from the pellets; and
   fabricating a molded article using the powder,
   wherein fabricating the molded article using the powder comprises:
      providing the powder to a ram extruder configured to extrude an intermediate mass at about 190° C. to about 220° C.

2. The method of claim 1, wherein the composite comprises:
   about 99 parts by weight to about 99.8 parts by weight of ultra-high molecular weight polyethylene;
   about 0.2 parts by weight to about 1 part by weight of carbon nanotubes; and
   about 0.1 parts by weight to about 0.5 parts by weight of a light stabilizer.

3. The method of claim 2, wherein an amount of the carbon nanotubes is about 0.2 parts by weight to about 0.5 parts by weight.

4. The method of claim 1, wherein the light stabilizer is a hindered amine light stabilizer.

5. The method of claim 1, wherein the carbon nanotubes comprise:
   a generalized diameter of about 8 nm to about 15 nm; and
   an average longitudinal dimension of about 10 μm to about 100 μm.

6. The method of claim 1, wherein the ultra-high molecular weight polyethylene comprises a molecular weight of about 1,000,000 g/mol to about 10,000,000 g/mol.

7. The method of claim 1, wherein preparing the composite comprises:
   preparing an initial mixture of the carbon nanotubes and the light stabilizer; and
   mixing the initial mixture with the ultra-high molecular weight polyethylene to prepare the composite,
   wherein the carbon nanotubes and the light stabilizer are uniformly dispersed in the composite.

8. The method of claim 1, wherein preparing the powder comprises:
   freeze-pulverizing the pellets to form an intermediate powder; and
   extracting moisture from the intermediate powder to form the powder.

9. The method of claim 1, wherein fabricating the molded article using the powder further comprises:
   cutting the intermediate mass to form the molded article; and
   annealing the molded article at about 120° C. to about 140° C.

* * * * *